Feb. 22, 1966  H. ZAHN  3,236,580
PULL DOWN ARRANGEMENT FOR CINEMATOGRAPHIC APPARATUS
Filed April 27, 1965  8 Sheets-Sheet 1

Fig.1

Inventor:
Heinrich Zahn by Michael J. Striker
attorney

Feb. 22, 1966  H. ZAHN  3,236,580
PULL DOWN ARRANGEMENT FOR CINEMATOGRAPHIC APPARATUS
Filed April 27, 1965  8 Sheets-Sheet 7

Fig.8

Inventor:
Heinrich Zahn by Michael J. Striker
attorney

Feb. 22, 1966  H. ZAHN  3,236,580
PULL DOWN ARRANGEMENT FOR CINEMATOGRAPHIC APPARATUS
Filed April 27, 1965  8 Sheets-Sheet 8

Fig.9

Inventor:
Heinrich Zahn by Michael J. Striker
attorney

United States Patent Office 3,236,580
Patented Feb. 22, 1966

3,236,580
PULL DOWN ARRANGEMENT FOR
CINEMATOGRAPHIC APPARATUS
Heinrich Zahn, Robdorf, near Darmstadt, Germany,
assignor to Fernseh G.m.b.H., Darmstadt, Germany
Filed Apr. 27, 1965, Ser. No. 451,110
Claims priority, application Germany, Sept. 10, 1960,
F 32,089
10 Claims. (Cl. 352—185)

This is a continuation-in-part of my application Serial No. 136,470, filed September 7, 1961, and now abandoned.

The present invention relates to kinematographic apparatus and especially concerns arrangements for the rapid pulldown of kinematographic films.

Numerous constructions for this purpose have already been proposed but up to now no satisfactory solution for this problem has been known. There are serious difficulties in effecting the required intermittent advance of the film within the desired time of about 1.2 milliseconds, without damaging it or putting too great a strain upon it. In the constructions which have been adopted in practice, a considerably longer time is required for the film transport.

For special purposes, especially for recording television pictures on kinematographic film or scanning a kinematographic film in a film scanner, it would be very advantageous to effect the intermittent advance of the film within an interval of not more than 1.2 milliseconds so that the pulldown takes place within the so-called flyback time of the television picture tube.

Attempts have already been made to employ air pressure for the rapid pulldown of kinematographic films. However, to my knowledge, the pneumatic pulldown of kinematographic films has not been successfully carried out in practice because it has not been possible to overcome to a sufficient extent the technical difficulties here arising.

Accordingly, it is an object of the present invention to attain this goal by improved method and means without putting too high a strain upon the material of the film. This is achieved by a novel combination of two film clamping devices controlled in a special manner with means for intermittently advancing a film and with a pneumatic transport device.

It is another object of the invention to provide means for precisely framing the film in the film gate of a kinematographic apparatus with rapid pulldown.

It is a further object of the invention to improve the means for transporting the film by providing a common rotary member arranged to operate both clamping devices, one at a lower and the other at a higher angular velocity.

It is still another object of the invention to provide braking means, arranged to brake the film run in the region of the first clamping device thus preventing the film from moving backward during such intervals when the claw feeding the film into the said first clamping device is removed from the perforation and the clamping device is opened.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

Aanalogous parts are designated by the same reference characters in all the figures. In the partly schematically drawn figures all of the units not absolutely necessary for the understanding of the invention are omitted.

Figure 1:
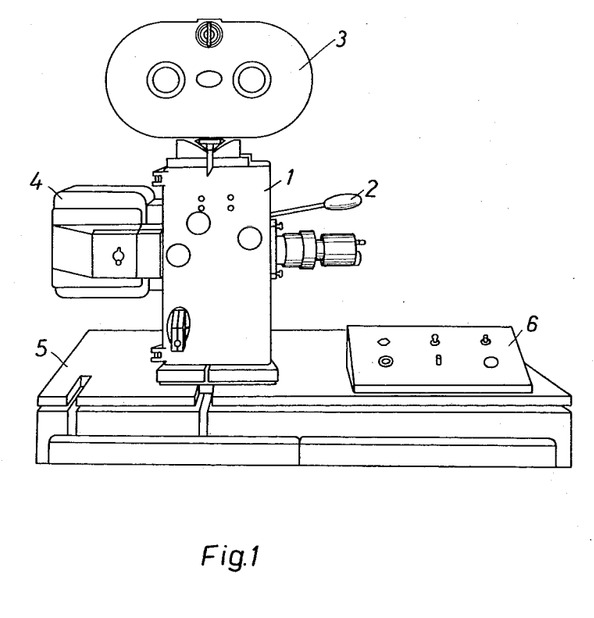
FIG. 1 shows the upper part of a kinematographic apparatus which embodies one form of the invention.

FIG. 1 is a perspective view of the upper part of a kinematographic apparatus having a casing 1 which contains the driving means for the film. Rearwdly of the casing 1, there is mounted a driving motor (not shown). The stator of the driving motor is journalled in bearings, its angular position being adjustable by means of a lever 2. A casing 3 encloses the upper spool. A cathode ray tube with associated parts, e.g., spool optical elements (not shown), is arranged within a casing 4, the cathode ray tube serving in a well known manner as a light source either for recording television pictures on the film or for scanning a kinematographic film. The casing 1 is mounted on a base plate 5 which is situated on top of a cubicle which contains the take-up spool, amplifiers and other electrical components. The base plate 5 also supports a panel 6 with electrical switches for stand by, start, stop and other functions.

Figures 2, 2A:
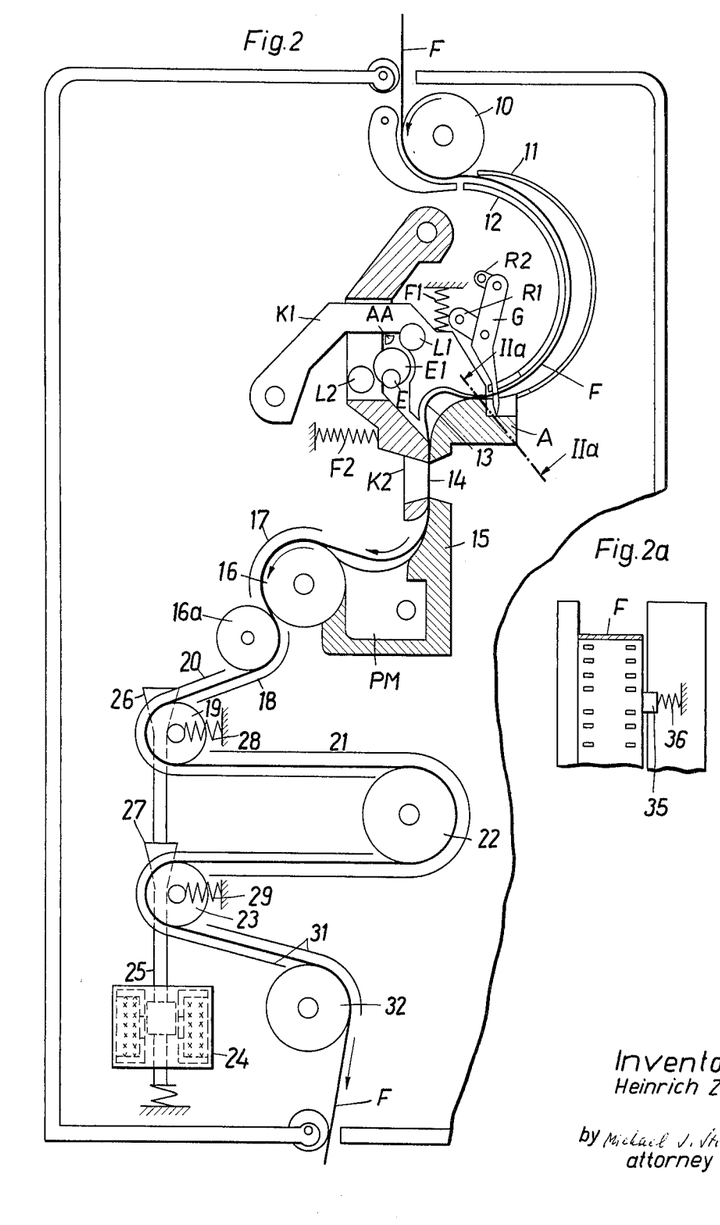
FIG. 2 is a diagram illustrating the film path through the kinematographic apparatus.
FIG. 2a is a transverse section as seen in the direction of arrows from the line IIa—IIa of FIG. 2.
Figure 9:
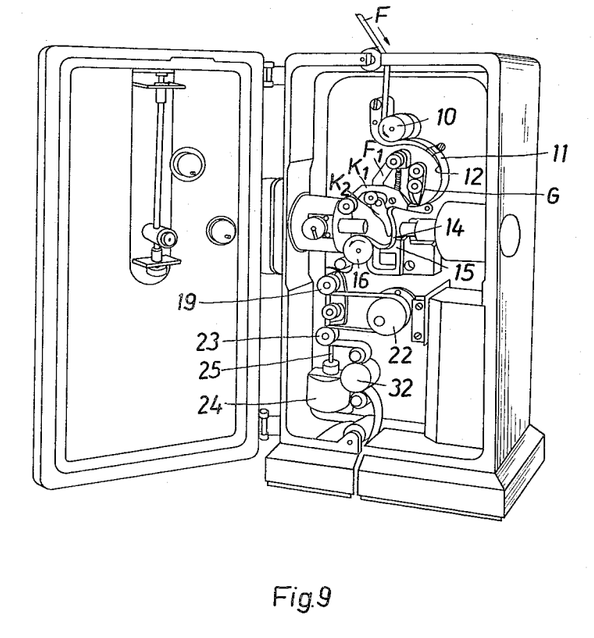
FIG. 9 is a perspective view of an embodiment of the invention.

FIGS. 2 and 9 show the film path through a kinematographic apparatus which embodies the invention. The film F coming from a feed spool (not shown) in the casing 3 is engaged by a feed sprocket 10 and is led between two arcuate guide plates 11 and 12 so that, when the film comes within the range of a claw G, this claw enters a perforation of the film. The transport of the film is now effected by the claw G which pushes the film forwardly so that the film forms a storage loop 13. This part of the mecahnism is better shown in FIGS. 6a–6c and 7. From the storage loop 13, the film is led toward a picture gate 14 by appropriate formation of a first clamping cheek $K_1$ and the film then passes between the picture gate 14 and a second clamping cheek $K_2$ which latter is lifted for the threading process by a device which will be explained later in connection with FIG. 7. A member 15 which carries the picture gate 14 is shaped as a curve so that it leads the film to a further sprocket 16.

Guide plates effect the further guiding of the film in a manner which will be explained in connection with the description of FIG. 7.

By appropriate shaping of a guide plate 17 which surrounds a portion of an idler sprocket 16, as well as of a further guide plate 18 which cooperates with an idler sprocket 16a and acts as a stripper, the film is compelled to advance to and around a guide pulley 19, and into a channel which is formed by two guide plates 20 and 21. After it has advanced through this channel, the film is led to a sound drum 22, and after passing around this sound drum, it is led through a further channel to a further guide pulley 23.

The repeated guiding of the film between fixed guide plates gives rise to frictional forces on the film, which renders it difficult, during the threading-up of the projector, for the sprocket 10 and claw G to insure further forward movement of the film. By the application of mains alternating current to a tension magnet 24, a pull rod 25 provided with wedge-shaped components 26 and 27 which engage the shafts of the guide pulleys 19 and 23 is now set into oscillation. As a result of such oscillation, the guide pulleys 19 and 23 are set into horizontal oscillatory movement under the influence of the springs 28 and 29 at the frequency of 50 c./s. Thus, on each movement of pulleys 19 and 23, the film is urged forward by a small step. Owing to the high number of such small steps per second, the film is carried forward until it reaches the last sprocket 32 through a further channel 31. Driven by the sprocket 32, which rotates at a constant speed, the film leaves the projector transport mechanism and can be led by hand to a take-up device, e.g., a take-up spool situated in a cubicle located at a level below the casing 1.

In the region of the clamping cheek $K_1$, there is arranged a small pad 35 which is pressed against the adjacent edge of the film F by a spring 36, see FIG. 2a. Thus, the pad 35 acts as a brake and prevents the film run in the region of the clamping cheek $K_1$ from moving backward during such intervals when the claw G feeding the film into the clamping cheek $K_1$ is withdrawn from the perforation and the clamping cheek releases the film.

In order to make possible rapid starting and rapid stopping, as well as satisfactory operation of the whole film transport device, the switches for the driving motor of the film transport mechanism, for the motor which drives the sound drum, and for the tension magnet 24 must be coupled together.

In the "Stand-by" position, current is fed to the tension magnet 24, to the driving motor for the sound drum 22 and to the motor used to drive a vacuum pump serving to produce the vacuum necessary for the operation of the pneumatic rapid pulldown mechanism PM. On pressing the starter button, the projector motor runs, the tension magnet 24 and drive motor for the sound drum 22 drop out, and the vacuum pump still runs. On pressing the stop button, the projector motor is immediately stopped, the tension magnet 24 and drive motor for the sound drum 22 come into action, and the vacuum pump still runs. The magnet 24 and the drive motor for the sound drum 22 come into action on pressing the stop button in order to continue the movement of the trailing end portion of the film to the take-up spool after actual projection terminates so that there is no longer any projection of an image through the film gate.

In addition, the drive for the take-up spool for the film run through the projector mechanism must be controlled in a suitable manner by the control or coupling device briefly described above.

Figure 3:
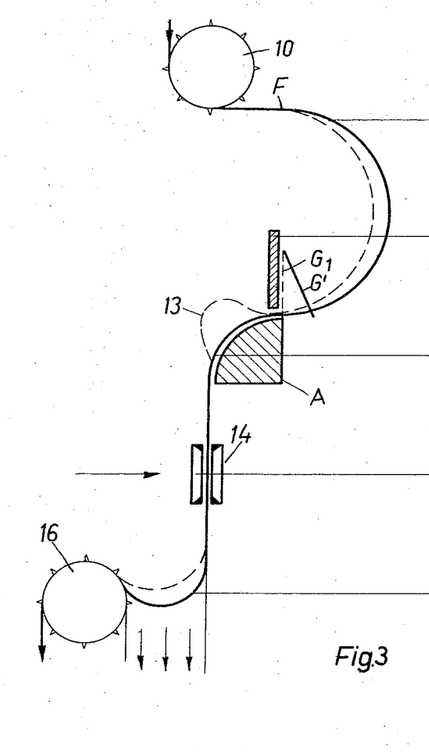
FIG. 3 is a schematic diagram showing the film path through the projector.
Figure 4A:
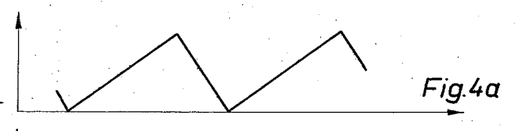
FIGS. 4a–4e show timing diagrams, explaining the mode of operation.
Figure 4B:
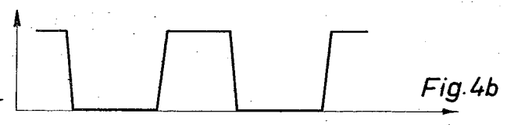
Figure 4C:
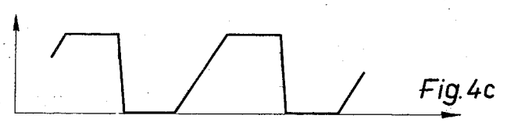
Figure 4D:
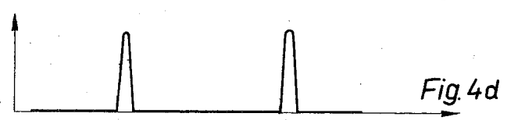
Figure 4E:
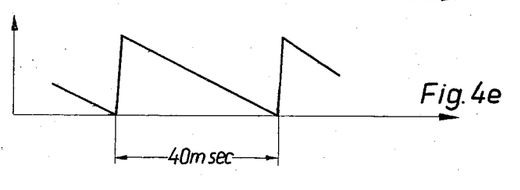

FIG. 3 is a diagram of the film path which serves to illustrate the film transport action, while FIGS. 4a–4e show a series of timing diagrams illustrating the variation with time of the lengths of the various film loops and also the movements of the moving clamping cheeks at the two clamping positions. FIG. 4a shows that, under the influence of the upper sprocket 10 which is driven at a constant speed, the length of the upper loop increases in proportion to time and thereafter, under the influence of the claw movement, the length of the loop is reduced approximately in proportion to time. The range of movement of the claw G is here indicated by the angle between the full and broken lines G and $G_1$. Just after the claw G is situated the clamping cheek $K_1$ which periodically presses the film against the arcuately curved catching member 15 shown in FIG. 3. From the corresponding diagram given in FIG. 4b, it may be appreciated by comparison with the diagram of FIG. 4a, that during the claw movement this cheek $K_1$ is opened, while during the remaining (longer) time it remains closed. In the region of the arcuate catching member 15, the film periodically forms a loop (shown by a chain line) the length of which varies with time as shown in FIG. 4c. Below the catching member 15 is the gate 14 in which the film is normally clamped by the clamping cheek $K_2$ but is periodically released for a short time. Below the cheek $K_2$, the film traverses a pneumatic chamber forming part of the mechanism PM, in which a difference in pressure acts between the convex and concave sides of the arcuately curved film in the direction of the arrows. When, therefore, the cheek $K_2$ opens, as illustrated in FIG. 4d, the film is transported by suction from the position shown in broken to that shown in full line in less than 2 milliseconds. The periodic time of this film transport action amounts to 40 milliseconds. The variation with time of the length of the loop in the pneumatic chamber is shown in FIG. 4a; the beginning of the instantaneous film transport is indicated by the two vertical broken lines.

Figure 5:
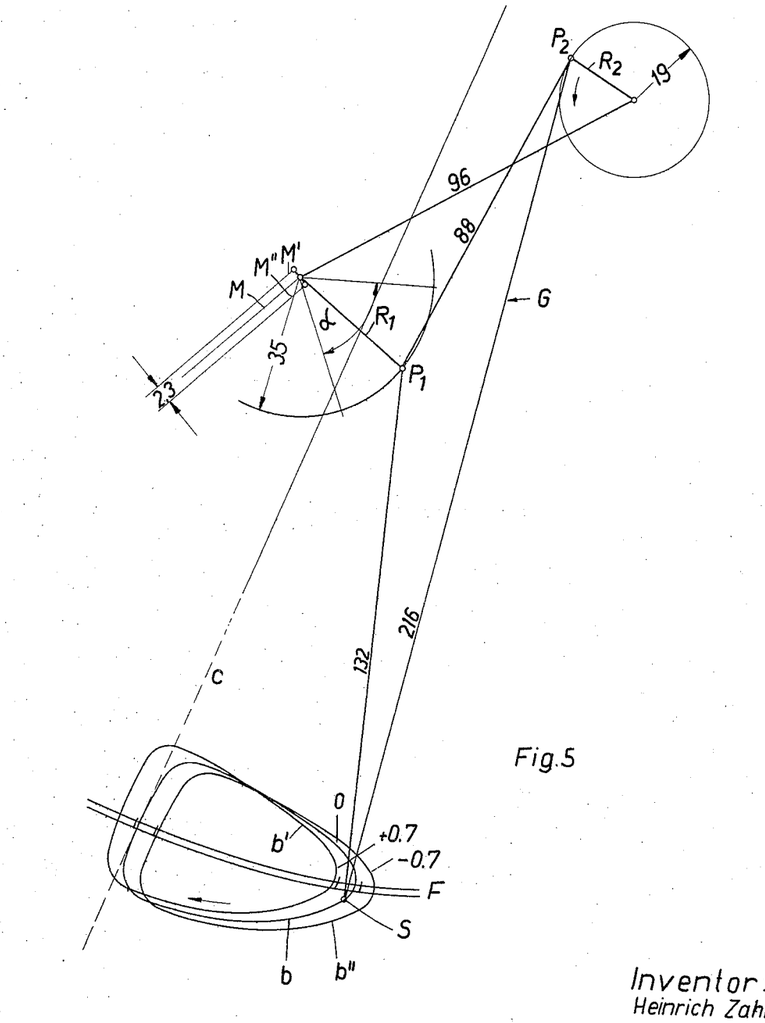
FIG. 5 is a diagram illustrating the claw movement.

FIG. 5 shows the claw movement. The claw schematically indicated at G is pivotally secured to a pair of crank arms at the points $P_1$ and $P_2$. The two crank arms are schematically illustrated by the radii $R_1$ and $R_2$. The crank arm $R_2$ is continuously driven and rotates at a constant speed. Owing to the rigid connection between $P_1$ and $P_2$ the point $P_1$ executes an enforced oscillatory movement through the indicated angle $\alpha$. In other words, the crank arm $R_1$ constitutes a swing lever which oscillates back and forth between two angularly spaced end positions and about a fixed shaft $Sh$.

The apex S of the claw G enters the perforations of the film F and describes the path $b$ in the sense of the indicating arrow. In FIG. 5, the claw G is shown in a position in which its apex S has just begun to enter a perforation of the film F. In this region, the film is compelled to follow a circular path, which is preferably configurated in such a way that the claw G is moved radially both at the time of entry (position shown) and also at the moment of withdrawal of the apex S, and is thus normal to the circular path and therefore also normal to the stressed edge of the perforation. As shown in FIG. 5, the apex S will travel in a path $b$, $b'$, or $b''$ each of which resembles an isosceles triangle. The base of each triangle is nearest to the cheek $K_1$ and the apex of each triangle is distant from the cheek $K_1$ so that the apex S is retracted from a perforation while moving along the base and engages the film when located at the apex of the respective triangle.

After the apex S of the claw G enters into the film perforation, the movement of the claw apex is approximately uniform from the beginning of film transport, that is, from the point of time at which the active edge of the claw touches the corresponding edge of the film perforation, so that the movement of the film is at first slightly accelerated and thereafter gradually retarded. In the position indicated by the broken line $c$, the apex S of the claw G is again withdrawn from the perforation in a direction which is normal to the film path. The time of the film transport corresponds to about a third of the interval during which the crank arm $R_2$ completes a full revolution.

The just described operation is reversible by altering the direction of rotation of the crank arm $R_2$; on reversing the direction of rotation of this crank arm, the film is transported step-by-step in the opposite direction.

For purposes of framing adjustment, the pivot point of the crank arm $R_1$ is movably mounted, preferably on a disc or a lever which is adjustable by means of an eccentric. The advantage of such arrangement is that the relative position of the gate 14 within the imaging optical path does not have to be moved but remains unaltered. Only the position of the individual film frames relative to the gate is altered. In the three positions for the pivot of the crank arm $R_1$, marked by lines M, M', and M'', the apex S of the claw G describes the curves designated $b$, $b'$ and $b''$.

Figure 6A:
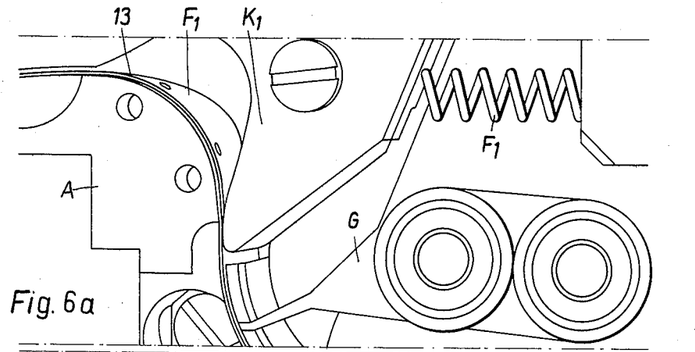
FIGS. 6a–6c show different phase of the claw movement.
Figure 6B:
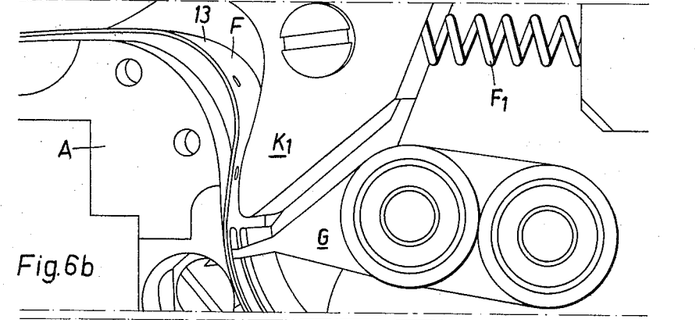
Figure 6C:
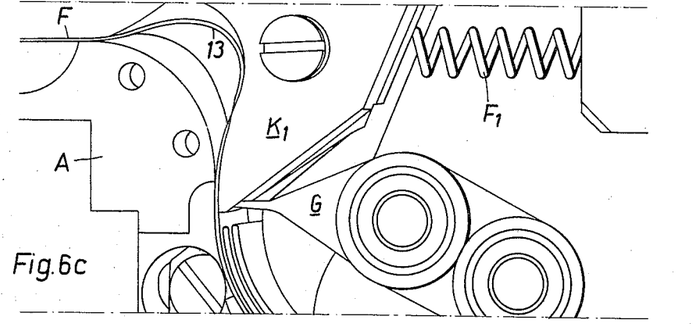

In FIGS. 6a–6c, three successsive phases of the claw movement are shown. In FIG. 6a, the claw G is shown in a position in which it begins to move its apex or tooth S into a perforation of the film F. The clamping surface of the cheek $K_1$ commences to rise at this instant in order to release the previously tightly clamped film.

FIG. 6b shows the clamping surface of the cheek $K_1$ in raised position. Here, the claw G has already completed a part of its working stroke and has moved the film partly into the storage loop 13 situated at the left.

FIG. 6c shows the position of the claw G at the instant when its apex S is withdrawn from the perforation in a direction perpendicular to the direction of film movement (upwards). At such time, the cheek $K_1$ has already begun its movement in a sense to clamp the film and, before the apex S of the claw G is withdrawn from the perforation, the film F is already held fast close to it. FIGS. 7 and 8 show this part of the mechanism in greater detail.

The claw G transports the film F in the direction of the arrow by the length of one film frame during each revolution of the crank arm $R_2$ and requires for correct transport an interval of time corresponding approximately to one-third of the time necessary for a complete revolution of the crank arm. In the interval during which the film is moved, the cheek $K_1$ opens under the influence of an eccentric E which rotates at a variable angular speed about the axis of a shaft $E_1$. This shaft $E_1$ is driven by a double crank which is illustrated in FIG. 8; the distance $a$ between the two axes is here so chosen and the shaft bearings are so arranged that the change in angular velocity fulfills the following functions:

As is well known, the driven side of a double crank rotates at a fluctuating angular speed in response to constant angular velocity of the drive. This feature is utilized in such a way that, in the range of reduced angular velocity, the cheek $K_1$ is raised by means of the eccentric E and a bearing $L_1$, while the opening of the cheek $K_2$ takes place while a bearing $L_2$ is struck by the eccentric E during the period when the shaft $E_1$ rotates at a higher angular speed. The return of the cheeks $K_1$ and $K_2$ and the generation of the clamping pressure is effected by springs $F_1$ and $F_2$. The sequence of movement of the claw G and cheek $K_1$ is so arranged that the cheek $K_1$ closes during the interval of time when the claw G leaves the perforation in a direction which is normal to the plane of the film. The position of the perforations thus attained, which determines the picture registration, is assisted by the definite urging of the edge of the perforation against the claw, effected by the inherent stress of the film in the storage loop 13. Since the loop has the tendency to straighten itself, the edge of the perforation is strongly pressed against the leading edge of the claw tooth.

In order to introduce the film into the projector mechanism prior to start of projection, the cheek $K_2$ must release the film and the cheek $K_1$ must cooperate with the claw G in the manner previously described. This lifting is effected by turning a cam AA. This cam is mounted on a rotatable shaft and is formed with three ground surfaces inclined with reference to each other through angles of about 60°. By turning the cam AA from the position shown, in the counter-clockwise direction, the edge between the ground surfaces lies against the corresponding opposing surface of the cheek $K_2$ and, on further rotation, the cheek $K_2$ is lifted and the film channel is freed. On still further rotation, the cheek $K_1$ is lifted and it thus becomes possible to draw the film forwards out of the projector mechanism. Thus, the film can be removed from the mechanism at any time, even when it has not yet run out and is thus in part situated on the feed spool.

Figure 7:
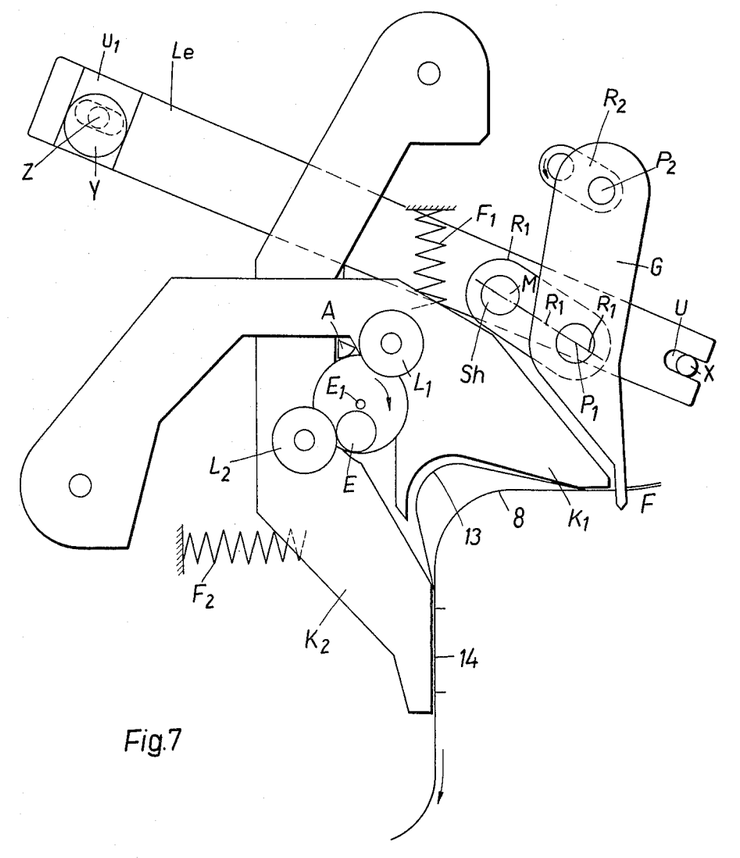
FIG. 7 shows a preferred embodiment of the claw and of the clamping devices.
Figure 8:
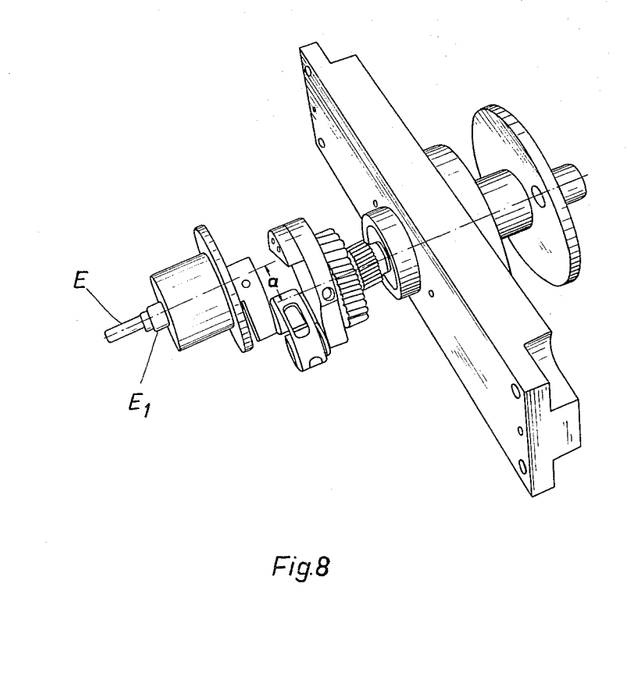
FIG. 8 shows a preferred embodiment of the eccentric drive for the clamping devices.

FIG. 7 further shows a lever Le which is utilized to adjust the position of the shaft Sh for the crank arm $R_1$. The lever Le is rockable about a shaft X which passes through a longitudinally extending slot U provided at one end of this lever. The other end of the level Le is formed with a transverse recess $U_1$, which receives a disk-shaped rocking cam Y. The cam Y is rotatable about an eccentric pin Z whereby the lever Le moves longitudinally and changes the position of the shaft Sh so that the apex S of the claw G will travel in the path $b$, $b'$ or $b''$ (see FIG. 5). In other words, the lever Le and the rocking cam Y serve to move the fixed pivot axis of the crank arm $R_1$ from the position M to the position M' or M'', or vice versa, whereby the position of the individual film frames relative to the gate 14 changes while the gate remains stationary.

The film transport device according to the invention renders it possible to make the film run backwards at any time, for example, in order to run once again a part of the film already projected. This is especially advantageous for television studio operation, since many producers resort to the practice of mixing film extracts with stage action. Usually, the scenes to be mixed one after the other are present in the film in the correct sequence. If now, during rehearsal, a scene requires to be repeated possibly more than once, it is of great advantage if it is not necessary after each rehearsal for the film to be first taken out of the apparatus and re-wound, i.e., if the film can be re-wound in the projector without changing the threading.

In the arrangement according to the invention the film is not pulled back intermittently with extreme rapidity, but only with the usual intermittent velocity. This, however, is sufficient for the content of the projected picture to be clearly recognized, so that the producer or operator can determine from the visible picture content alone when the re-wind should be ended.

The success of apparatus according to the invention is based upon the proposition that for perfect rapid pull-down of the film it is essential not to apply too high a mechanical stress to the edges of the perforations. The pulldown force, in this case the air pressure, is therefore distributed over a large area and, in addition, during the very short time of transport, the film is not engaged along the edges of the perforations.

Apparatus according to the invention may also be analogously applied for the transport of film in film cameras. The short pulldown time thus obtainable makes it possible to employ such cameras for the continuous recording of television pictures on kinematographic film and to carry out the film transport always during the so-called picture suppression interval of the television transmission. In its application in film projectors, the usual rotating shutter may be omitted because of the shortness of the film transport time, which yields a substantial increase in the mean value of the picture brightness.

What is claimed as new and desired to be secured by Letters Patent is:

1. In a motion picture apparatus, in combination, a film gate; guide means located in advance of and subsequent to said film gate for guiding film to and from said film gate; first clamping means located adjacent said guide means and in advance of said film gate and second clamping means located at said film gate, each clamping means being movable between a clamping position preventing movement of the film and a non-clamping position releasing the film for movement; pneumatic means located adjacent said guide means subsequent to said film gate for advancing film past said film gate when said second clamping means is in said non-clamping position thereof; actuating means cooperating with said first and second clamping means for alternately actuating the latter to place said second clamping means in said non-clamping position while said first clamping means is in its clamping position and to place said second clamping means in said clamping position while said first clamping means is in its non-clamping position; and claw means located adjacent said guide means in advance of said first clamping means for advancing the film in a stepwise manner toward said gate while said first clamping means is in said non-clamping position thereof, said claw means including an elongated claw member having a toothed end adapted to enter into a film perforation, a rotary crank pivotally connected to an end portion of said claw member distant from said toothed end thereof for continuously moving said end portion of said claw member along a circular path, and a swing lever pivotally connected to said claw member between said crank and toothed end thereof and having a stationary pivot axis distant from its connection to said claw member, said rotary crank and swing lever cooperating to provide said toothed end of said claw member with an endless path of movement conforming substantially to the configuration of an isosceles triangle whose base is nearest to said first clamping means and whose apex is distant from said first clamping means so that the toothed end of said claw member is retracted away from the film while moving along said base and engages the film when located at said apex.

2. In an apparatus as recited in claim 1, said guide means and said endless path of movement of said toothed end of said claw member having with respect to each other a relationship which provides film a path of movement extending from said apex substantially perpendicular across said base of said triangle.

3. In a motion picture apparatus, in combination, a film gate; guide means located in advance of and subsequent to said film gate for guiding film for movement past said film gate; support means; a pair of clamping levers pivotally supported by said support means for swinging movement toward and away from said guide means respectively to clamping and non-clamping positions clamping the film against said guide means and releasing the film for movement along said guide means, respectively, one of said levers engaging the film in advance of the film gate and the other of said levers engaging the film at the film gate; a pair of spring means respectively urging said levers to said clamping positions thereof; a rotary actuating member located between said levers and supported for rotation by said support means, said levers repsectively having portions located along the path of movement of said rotary actuating member to be successively engaged thereby and said rotary actuating member engaging during each revolution first said one and then said other lever to alternately displace the latter from said clamping to said non-clamping positions; drive means operatively connected to said rotary actuating member for rotating the latter during each revolution with a non-uniform angular velocity which is greater when said actuating member engages said other lever than when said actuating member engages said one lever; pneumatic means located adjacent said guide means subsequent to said gate for advancing film past the latter when said other lever is in its non-clamping position; an elongated claw member extending substantially perpendicularly with respect to said guide means adjacent to but in advance of said one lever and having a toothed end at said guide means for entering into a film perforation, said claw member having an opposite end distant from said toothed end thereof; rotary crank means supported for rotation by said support means and operatively connected to said opposite end of said claw member for moving said opposite end along a circular path; and a swing lever pivotally supported by said support means and pivotally connected to said claw member intermediate said ends thereof and cooperating with said rotary crank means for providing said toothed end of said claw member with an endless path of movement conforming generally to the configuration of an isosceles triangle whose base is adjacent and whose apex is distant from said one lever so that said toothed end of said claw member is retracted away from the film while moving along said base and engages the film when located at the apex of said triangle.

4. In a motion picture apparatus, a film gate; first guide means located in advance of and arranged to guide a length of film to said film gate; second guide means located past and arranged to guide the film from said film gate; first clamping means adjacent to said first guide means; second clamping means located at said film gate, each of said clamping means being movable between a clamping and a releasing position for respectively preventing and permitting movement of the film; pneumatic means adjacent to said second guide means and arranged to advance the film along said film gate when said second clamping means is in said releasing position; actuating means cooperating with said first and second clamping means for alternatively actuating the latter to place said second clamping means in said releasing position while said first clamping means is in its clamping position, and vice versa; claw means adjacent to said first guide means and arranged to advance the film in stepwise fashion toward said film gate while said first clamping means is in releasing position, said claw means including an elongated claw member having a toothed end adapted to enter into a film perforation, a rotary crank pivotally connected to a portion of said claw member distant from said toothed end for continuously moving said portion along a circular path, and a swing lever pivotally connected to said claw member between said crank and said toothed end and having a stationary pivot axis distant from its connection to said claw member, said crank and said swing lever cooperating to provide a substantially triangular endless path for movement of said toothed end; and means for adjusting the position of the stationary pivot axis for said swing lever and for thereby displacing said substantially triangular endless path for movement of said toothed end.

5. A structure as set forth in claim 4, wherein said adjusting means for the pivot axis of said swing lever comprises a second lever rockable about a fixed axis, rocking means for changing the angular position of said second lever with reference to said fixed axis, and a shaft carried by said second lever between said fixed axis and said rocking means and defining said pivot axis for said swing lever.

6. A structure as set forth in claim 5, wherein said rocking means comprises an eccentric and wherein said fixed axis is defined by a second shaft received in an elongated slot provided in said second lever.

7. In a film pulldown mechanism for kinematographic apparatus, in combination, a film transporting claw having an end portion arranged to extend into and from a perforation of the film, and a second portion spaced from said end portion; orbiting means for rotating the second portion of said claw about a fixed axis; a swing lever having a first end coupled to said claw intermediate said orbiting means and said end portion, and a second end arranged to oscillate about a predetermined pivot axis which is parallel with said fixed axis whereby the end portion of said claw defines a substantially triangular path in response to rotation of the second end portion of said claw and in response to resultant oscillation of said swing lever; and adjusting means for changing the position of said pivot axis.

8. In a film pulldown mechanism for kinematographic apparatus, in combination, a film transporting claw having an end portion arranged to extend into and from a perforation of the film, and a second portion spaced from said end portion; orbiting means for rotating the second portion of said claw about a fixed axis; a swing lever having a first end coupled to said claw intermediate said orbiting means and said end portion, and a second end arranged to oscillate about a predetermined pivot axis which is parallel with said fixed axis whereby the end portion of said claw defines a substantially triangular path in response to rotation of the second end portion of said claw and in response to resultant oscillation of said swing lever; and adjusting means for changing the position of said pivot axis, said adjusting means comprising a carrier turnable about a second fixed axis which is parallel to said first named fixed axis, a shaft secured to said carrier, said shaft being spaced from said second fixed axis and defining said pivot axis for said swing lever, and rocking means for changing the angular position of said carrier with reference to said second fixed axis.

9. A structure as set forth in claim 8, wherein said rocking means comprises an eccentric and wherein said pivot axis is located between said eccentric and said second fixed axis.

10. In a film pulldown mechanism for kinematographic apparatus, in combination, a film transporting claw having an end portion arranged to extend into and from a perforation of the film, and a second portion spaced from said end portion; orbiting means for rotating the second portion of said claw about a fixed axis; a swing lever having a first end coupled to said claw intermediate said orbiting means and said end portion, and a second end arranged to oscillate about a predetermined pivot axis which is parallel with said fixed axis whereby the end portion of said claw defines an endless path resembling an isosceles triangle in response to rotation of the second end portion of said claw and in response to resultant oscillation of said swing lever, said end portion of the claw being arranged to enter a perforation while moving at the apex of said endless path and to be withdrawn from such perforation while moving along the base of said endless path; and adjusting means for changing the position of said pivot axis.

References Cited by the Examiner

UNITED STATES PATENTS

| 1,413,610 | 4/1922 | Pittman | 352—79 |
| 1,781,945 | 11/1930 | Case | 179—100.3 |
| 1,851,448 | 3/1932 | Ross | 352—190 |
| 2,560,919 | 7/1951 | Bedford | 226—95 |
| 2,747,457 | 5/1956 | Wengel | 352—184 |

OTHER REFERENCES

Wengel, Raymond W., "Pneumatic Pulldown 16 Mm. Projector," Journal of the Society of Motion Picture and Television Engineers, N.Y., May 1954, vol. 62, No. 5, pp. 384–390.

Moller, German printed application No. 1,073,859, pub. Jan. 21, 1960.

Moller, German printed application No. 1,077,972, pub. Mar. 17, 1960.

Moller, German printed application No. 1,086,547, pub. Aug. 4, 1960.

NORTON ANSHER, *Primary Examiner.*

HAROLD H. FLANDERS, *Assistant Examiner.*